3,707,582
PHOSPHORUS COMPOUND PROMOTED OLIGOMERIZATION OF ISOBUTENE
Gary L. Driscoll, Boothwyn, Pa., assignor to Sun Research and Development Co., Philadelphia, Pa.
No Drawing. Continuation-in-part of abandoned application Ser. No. 53,268, July 6, 1970. This application June 7, 1971, Ser. No. 150,740
Int. Cl. C07c 3/18
U.S. Cl. 260—683.15 B                  9 Claims

ABSTRACT OF THE DISCLOSURE

A promoted polymerization of isobutene to form a polyisobutene oil having a viscosity index of from 95 to 130, using phosphorus trichloride or phosphorus oxychloride as the promoter, stannic chloride as the catalyst, and nitromethane as the solvent at from −30° C. to 100° C. and preferably from 0° C. to 50° C. The stannic chloride is present in from 0.1 to 40 and preferably 1 to 20 volume percent as based on nitromethane and phosphorus compound is present in a volume ratio of from 0.1:1 to 5:1 phosphorus compound:stannic chloride.

CROSS REFERENCES TO RELATED APPLICATIONS

This application is a continuation-in-part of U.S. application Ser. No. 53,268, filed on July 6, 1970, and now abandoned by Gary L. Driscoll, entitled "Phosphorous Compound Promoted Oligimerization of Isobutene."

This application is related to U.S. application Ser. No. 52,773, filed on July 6, 1970 by Gary L. Discoll and David L. Kerr, entitled "Oligimerization of Isobutene and α-Methylstyrene", now U.S. Pat. No. 3,657,369; U.S. application Ser. No. 52,772, filed on July 6, 1970 by Gary L. Driscoll, entitled "Preparation of Oils from Isobutene," now U.S. Pat. No. 3,655,808; U.S. application Ser. No. 52,771, filed on July 6, 1970 by Gary L. Discoll, entitled "Polymerization of Dialkyl Vinylidene Compounds to Oils," now abandoned; and U.S. application Ser. No. 52,300, filed on July 6, 1970 by Gary L. Discoll, Irl N. Duling, David S. Gates and Robert W. Warren, entitled "Branched Hydrocarbons in the $C_{16}$–$C_{40}$ Range Having Maximally Crowded Geminal Methyl Groups"; the disclosures of which are hereby incorporated by reference.

BACKGROUND OF THE INVENTION

In the past traction transmissions utilizing rolling traction surfaces have found only limited use due to the lack of a fluid to lubricate such surfaces while still maintaining an adequate coefficient of traction. Recently several fluids have been discovered which have an adequate coefficient but which have a lower viscosity index than is desired. In the past synthetic oils prepared from isobutene have been produced using catalyst systems based on aluminum chloride and boron trifluoride. These systems are severe in nature and produce oils having a nearly continuous spectrum of carbon atoms and isomeric structures. In general, and apparently due to this wide spectrum of isomeric structures in the various individual oil molecules, these processes produce oils having a relatively low viscosity index. For instance these processes are unable to produce an oil derived from isobutene in the $C_{24}$–$C_{40}$ range having a viscosity index above 85. For many applications, including the use of these oils as a traction fluid or traction fluid component, a high viscosity index is desirable due to the variety of temperatures which may be encountered.

SUMMARY OF THE INVENTION

It has now been found that polyisobutene oils can be prepared having high viscosity index (hereinafter referred to as V.I.) which generally is in the range of from 90 to 130 and preferably 95 to 130 as determined as ASTM D–2270 as well as a Viscosity Temperature Function viscosity index in these ranges as determined by the technique of W. A. Wright as set forth in ASTM Bulletin #215, 84, (1956) (hereinafter referred to as VTF–VI). This is accomplished by proper selection of solvent and catalyst. The solvent serves as a polar solvent to solvate the intermediate carbonium ions formed during the reaction, and to complex the catalyst to give a catalytically active species which remains in the solvent phase. The solvent as used herein also dissolves appreciable amounts of monomer but only very limited amounts of the product olefins. This last property is believed to be responsible for the narrow molecular weight distribution obtained in the product which results in a more favorable product distribution as regards producing a high viscosity index product. Nitromethane has been found to be preferred for meeting these requirements as a solvent for this purpose.

The catalyst used in the present process is stannic chloride. The stronger Lewis acids, aluminum chloride, aluminum bromide, titanium tetrachloride and antimony pentachloride do not cause any polymerization of isobutene in nitromethane. Boron trifluoride in nitromethane gives an oil product having a lower viscosity index of about 75. Stannic chlorice has been found not to catalyze the polymerization of isobutene in such solvents as ether, water, dioxane, acetic acid, acetone, acetonitrile, acetic anhydride, diethylene glycol monoethyl ether, chloroform, methyl acetate, dimethoxyethane, N-methylpyrrolidone, and hexamethylphosphoramide.

The promoters for use herein are phosphorus trichloride or phosphorus oxychloride or mixtures thereof. The promoter serves to increase the rate of reaction but otherwise does not catalyze the reaction. The rate of polymerization with 60% of the stannic chloride replaced by phosphorus oxychloride shows a rate several times faster than in the absence of phosphorus oxychloride, and equivalent to the rate with an equal amount of 100% stannic chloride. In general little effect is observed until at least about 20 volume percent as based on the stannic chloride of the promoter is present, nor is any advantage gained if over about 500 volume percent of promoter is present as based on the stannic chloride. Preferably the promoter is present in an amount of from 100 to 500 volume percent of the stannic chloride present. The principal advantage to the system is that the phosphorus halides are less expensive than stannic chloride.

In general the temperature can be varied from 30° C. to 100° C. with from 0° C. to 50° C. being the preferred range and 25° C. to 35° C. being an especially preferred range. The volume of polyisobutene oil prepared is generally at least equal to the volume of nitromethane for a given run but the ratio of volume of oil prepared to volume of nitromethane present may easily exceed 10:1. When carrying out the present invention in a continuous operation by continuously feeding isobutene, stannic chloride, phosphorus halide and nitromethane while continuously removing the reaction medium and separating the product from the catalyst, promoter and solvent: the ratio of nitromethane to polyisobutene generally is maintained from 0.5:1 to 2:1.

The catalyst may be used in an amount equal to from 0:1 to 40 volume percent of the nitromethane present, and preferably from 1 to 20 volume percent of the nitromethane present.

The concentration of free isobutene in the reaction medium is relatively small and can be controlled by the pressure maintained at a given temperature thus controlling the molecular weight of the product. Generally pressures of from about 10 to 100 p.s.i. absolute have been found most suitable.

Conversions or isobutene to the various telomers of 100% are obtained under appropriate combinations of conditions. Yields of 300 to 500 ml. of oil per gram of catalyst are readily attainable. The feedstock can vary from 5 to 100 percent isobutylene, the remainder being any inert hydrocarbons. The presence of other butenes, each in amounts equal to the isobutene concentration, is not detrimental, since isobutene is selectively polymerized by the catalyst system. The efficiency of isobutene removal from such isobutene-butene mixtures depends on the particular conditions being used, but can be at least 80%. The present process is relatively insensitive to small amounts of impurities such as air, water, organo-sulfur or organo-nitrogen compounds.

The polyisobutene oils of the present invention may have a molecular weight of from 224 to 2000. The preferred product is the tetramer to decamer range. The tetramer in the present case consists predominantly of a major and a minor component. The hydrogenated major tetramer component has the structure:

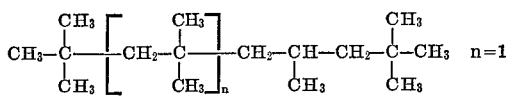

and the hydrogenated minor component has the structure:

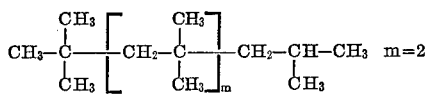

This latter type of structure predominates above the tetramer, i.e. at pentamer and above. The repeating unit for the pentamer and higher oligomers is indicated by the bracket in the structural formulae.

The oils produced by the present invention are useful in the as produced unsaturated form as electrical oils. When the oils are to be used as traction fluids they may be hydrogenated using a conventional hydrogenation catalyst such as Raney nickel, platinum, palladium or rhodium, to improve the oxidative stability thereof. However, the olefinic oils are relatively stable and do not require further treatment in order for them to be suitable for use as traction fluids. For most uses such as a traction fluid the higher molecular weight product may be left with the tetramer to decamer range material but the dimers and trimers should be removed therefrom along with the monomer. This is readily accomplished by distillation.

The oils as produced by the present invention find particular advantage in their use as traction fluids due to their high coefficients of traction and excellent viscosity-temperature properties. The requirements of a traction fluid are discussed in the following United States Patents:

| Patentee | Patent No. | Issue date |
|---|---|---|
| H. R. Kremmerer | 2,549,377 | Apr. 17, 1951 |
| W. C. Hammann et al | 3,411,369 | Nov. 19, 1968 |
| Do | 3,440,894 | Apr. 29, 1969 |

Exemplary tractive devices in which the traction fluids of the present invention find use are disclosed in the following United States Patents:

| Patentee | Patent No. | Issue date |
|---|---|---|
| A. W. Gardiner et al | 1,867,553 | July 19, 1932 |
| Z. V. Weisel | 2,871,714 | Feb. 3, 1959 |
| O. K. Kelley et al | 3,006,206 | Oct. 31, 1961 |
| F. G. de Brie Perry | 3,184,990 | May 25, 1965 |

Additionally these oils find use in caulks, and as reactants, electrical oils, etc.

DESCRIPTION

Example I

Nitromethane (200 ml.), POCl$_3$ (5 ml.), and SnCl$_4$ (1 ml.), are stirred in a three-necked, round bottomed flask (500 ml.) equipped with a gas inlet tube, mechanical stirred, reflux condenser, external bath and thermometer, while isobutene is passed into the mixture kept at 35° C. The inlet pressure is 10 p.s.i.g., the outlet is at 0 p.s.i.g. with no flow on the outlet side after air has been removed from the reactor. After 27 minutes the isobutylene flow is stopped and the contents of the flask transferred to a separatory funnel. After allowing five minutes for phase separation, the nitromethane layer is drained from the bottom of the funnel leaving 240 ml. of product. The oil layer is extracted twice with saturated sodium chloride solution. The oil layer is then dried over anhydrous calcium chloride leaving 214 ml. of oil. It is then placed in a vacuum distillation apparatus and distilled to obtain a trimer and tetramer fraction boiling at 30° C. to 80° C. at 0.5 mm. Hg, an oil fraction boiling at 80° C. to 200° C. at 0.25 mm. Hg and a residue. The amounts are: "trimer," 52 ml., oil, 120 ml.; and residue 25 ml. for a total recovery of 197 ml. The oil properties are: KV[1]$_{210°\ F.}$=3.23 cs., KV$_{100°\ F.}$=14.09 cs., VTF-VI=105, ASTM-VI=104.

Example II

The apparatus is set up as in Example I with the temperature controlled to 30° C. It is charged with 200 ml. of nitromethane and 1 ml. of SnCl$_4$. Under these conditions, the inlet pressure was 4 p.s.i.g. before unreacted isobutylene is emitted at the exit. With 2 ml. of added POCl$_3$ this increases to 6 p.s.i.g. With a total of 5 ml. POCl$_3$ added this is 10 p.s.i.g. in agreement with the previous results. The inlet pressure is approximately directly proportional to the rate of isobutylene feed (by weight) over this range. When the mixture is cooled to 10° C. the allowable inlet pressure drops to 4 p.s.i.g. and remains there after the addition of 3 ml. more of POCl$_3$. A further 1 ml. of SnCl$_4$ increases the allowable pressure to 15 p.s.i.g. at 10° C. This example illustrates the improvement in rate of reaction due to the POCl$_3$ and the limit of improvement that can be obtained in this manner. The oil produced has satisfactory properties.

The invention claimed is:

1. In a process for preparing polyisobutene oils comprising contacting isobutene with a mixture of nitromethane with a catalytic amount of stannic chloride at from −30° C. to 100° C. and recovering polyisobutylene, the improvement comprising having present from 20 to 500 volume percent as based on the stannic chloride present of a promoter selected from the class consisting of phosphorus trichloride and phosphorus oxychloride.

2. Process of claim 1 wherein the stannic chloride is present in an amount of from 0.1 to 40 volume percent as based on the nitromethane present.

3. Process of claim 2 wherein the temperature used is from 0° C. to 50° C.

4. Process of claim 3 wherein the amount of stannic

---
[1] As used herein KV stands for Kinematic Viscosity as determined by ASTM D-445.

chloride present is from 1 to 20 volume percent as based on the nitromethane present.

5. Process of claim 4 wherein the promoter is phosphorus oxychloride.

6. Process of claim 4 wherein the promoter is phosphorus trichloride.

7. A composition comprising nitromethane, from 0.1 to 40 volume percent of stannic chloride as based on the nitromethane and from 20 to 500 volume percent as based on the stannic chloride of a compound selected from the class consisting of phosphorus trichloride and phosphorus oxychloride.

8. Composition of claim 7 wherein the compound is phosphorus trichloride.

9. Composition of claim 7 wherein the compound is phosphorus oxychloride.

References Cited
UNITED STATES PATENTS

| | | | |
|---|---|---|---|
| 2,085,535 | 6/1937 | Langedijk et al. | 260—683.15 |
| 2,403,779 | 7/1946 | Bailey | 260—683.15 |

PAUL M. COUGHLAN, JR., Primary Examiner

U.S. Cl. X.R.

252—59, 429 R, 437